(12) United States Patent
Kanso

(10) Patent No.: US 9,069,728 B2
(45) Date of Patent: Jun. 30, 2015

(54) DISABLE RESTART SETTING FOR AMF CONFIGURATION COMPONENTS

(71) Applicant: Telefonaktiebolaget L M Ericsson (Publ), Stochkholm (SE)

(72) Inventor: Ali Kanso, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 238 days.

(21) Appl. No.: 13/875,114

(22) Filed: May 1, 2013

(65) Prior Publication Data

US 2014/0331079 A1   Nov. 6, 2014

(51) Int. Cl.
*G06F 11/07* (2006.01)
*G06F 11/20* (2006.01)
*G06F 11/00* (2006.01)

(52) U.S. Cl.
CPC .......... *G06F 11/2002* (2013.01); *G06F 11/008* (2013.01)

(58) Field of Classification Search
CPC  G06F 11/0793; G06F 11/008; G06F 11/1438
USPC .................................................... 714/6.3, 23
See application file for complete search history.

(56) References Cited

U.S. PATENT DOCUMENTS

| 2007/0180287 A1* | 8/2007 | Kumar et al. | 714/4 |
| 2011/0078797 A1* | 3/2011 | Beachem et al. | 726/25 |
| 2012/0233501 A1* | 9/2012 | Kanso et al. | 714/26 |

* cited by examiner

*Primary Examiner* — Chae Ko
(74) *Attorney, Agent, or Firm* — Nicholson De Vos Webster & Elliot, LLP

(57) ABSTRACT

A method and a system are provided for determining an AMF configuration of a highly available system with respect to whether to failover or restart a component when the component fails. The AMF configuration specifies at least two service-units containing components that represent resources, and a set of service-instances representing workload incurred by provision of services using the resources. The method identifies a failover duration and a restart duration for each component in a service-unit; and determines a failover outage and a restart outage for each service-instance impacted by a failure of a given component, based on the failover duration and the restart duration of each component in the service-unit. The method further determines whether to failover or to restart the given component if the given component fails, based on the failover outage and the restart outage of each service-instance impacted by the failure of the given component.

20 Claims, 4 Drawing Sheets

DISABLE RESTART SETTING FOR AMF CONFIGURATION COMPONENTS

TECHNICAL FIELD

Embodiments of the invention relate to software management; and more specifically, to the configuration of Availability Management Framework (AMF) for a highly available system.

BACKGROUND

The Service Availability Forum (SA Forum) is a consortium of industry-leading companies promoting a set of open specifications that enables the creation and deployment of highly available and mission critical services. As a standardization body, the SA Forum has defined a set of open specifications.

The Service Availability Forum (SAForum) defined a set of specifications for a High Availability (HA) middleware. The core of this middleware is the Availability Management Framework (AMF) (see, *SA Forum, Application Interface Specification, Availability Management Framework SAI-AIS-AMF-B.04.01*). The AMF is responsible for monitoring the components, detecting failures, and reacting to failures. The AMF performs the availability management according to a system configuration known as the AMF configuration. The AMF configuration is a logical organization of the software components describing how they are grouped, their dependencies, the services they provide, and the recovery policy that the AMF must apply in case of failure.

In an AMF configuration, the basic building block of the AMF configuration is the component, which abstracts a deployable instance of software/hardware resource. The service provided by such a component is represented by a component-service-instance. The components that collaborate closely and that must be collocated to provide a more integrated service are grouped into a service-unit. The workload assigned to the service-unit is referred to as the service-instance, which is a group of component-service-instances. The service-units composed of redundant component replicas form a service-group. The service availability management takes place within the service-group; i.e., the service instances are provided by service-units and protected against failures within the scope of the service-group. The AMF configuration also represents the nodes on which the components are deployed.

A system integrator is responsible for dimensioning the scope of those units and groups, and to define the recovery policies that are deemed most suitable for ensuring the service availability. These different entities correspond to increasing fault zones, where each fault zone is a scope that can be isolated and repaired to recover from a fault.

The AMF supports the notion of a redundancy model for a service-group. The redundancy model defines the redundancy scheme according to which the service-instances are protected. For instance, a 2N redundancy dictates that the service-group can have one active service-unit for all of the service-instances and one standby for all of the service-instances; i.e., a service-unit cannot simultaneously be active for some service-instances and standby for others. On the other hand, an N-way-active redundancy model allows for multiple active (but no standby) service-units in the service-group even for the same service-instance.

The AMF manages the high availability of services provided by software components according to the values of AMF configuration attributes. Some of the attributes are associated with protection and recovery policies. These policies specify the number of components assigned active/standby roles on behalf of a component-service-instance, and restrictions on standard recoveries. These attributes can be configured by the system integrator at the configuration time. Among these attributes is a component_disable_restart (also referred to as the "disable_restart attribute"), which has a Boolean value that specifies whether a component restart is a desirable recovery in case of failure. The AMF specification recommends that this attribute should be set to true if the component failover is faster than its restart, and otherwise it should be set to false.

SUMMARY

Embodiments of the invention provide a method and system for determining an AMF configuration of a highly available system. The AMF configuration specifies at least two service-units containing components that represent resources, and a set of service-instances representing workload incurred by provision of services using the resources.

In one embodiment, the method comprises identifying a failover duration and a restart duration for each component in a service-unit of the at least two service-units; and determining a failover outage and a restart outage for each service-instance impacted by a failure of a given component, based on the failover duration and the restart duration of each component in the service-unit. The method further comprises determining whether to failover or to restart the given component if the given component fails, based on the failover outage and the restart outage of each service-instance impacted by the failure of the given component.

In another embodiment, a computer system is adapted to determine an AMF configuration of a highly available system. The computer system comprises one or more memory devices, and one or more processors coupled to the one or more memory devices. The one or more processors are adapted to perform the method described above.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1:
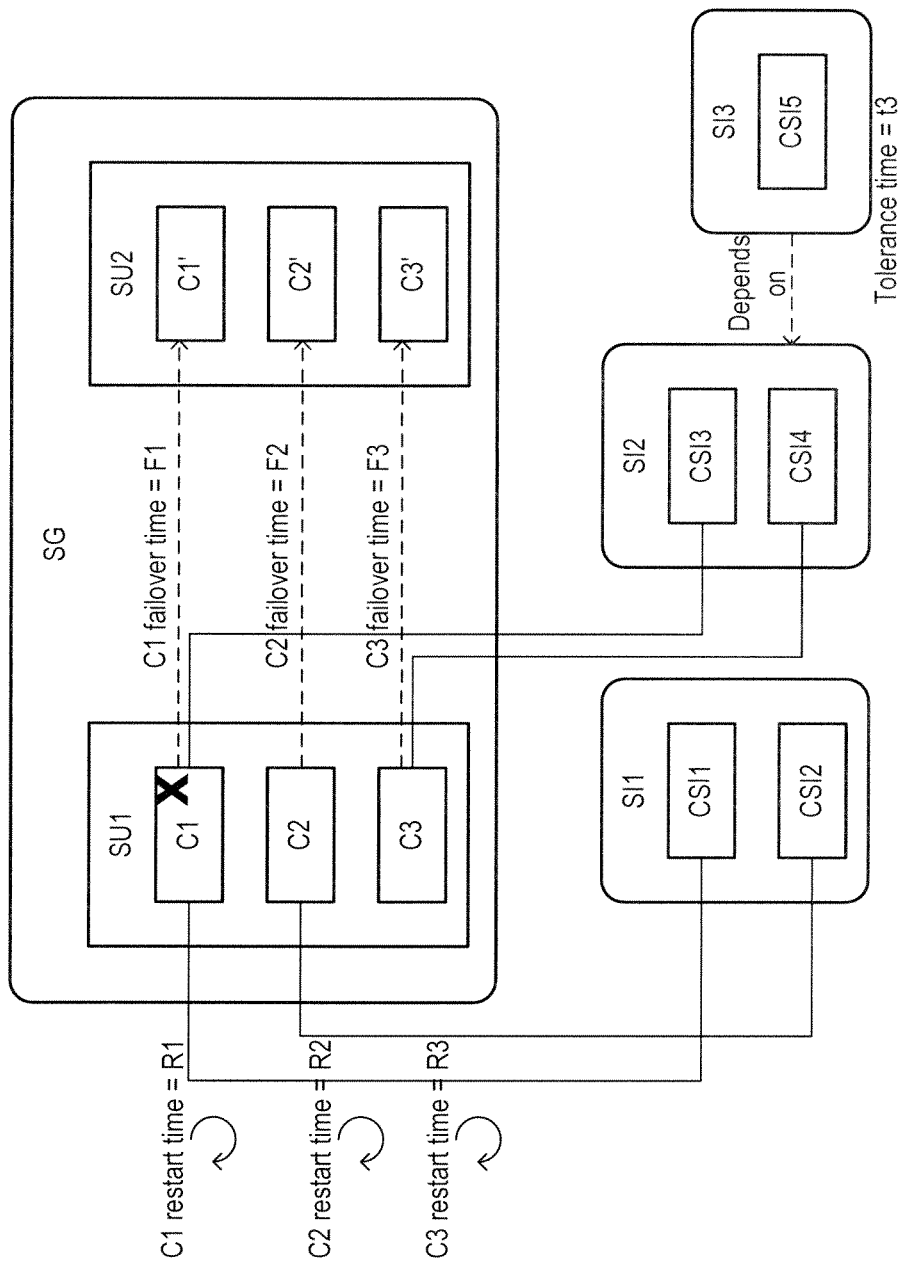
FIG. 1 is a block diagram illustrating an example of an AMF configuration for a system according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method and a system for determining an AMF configuration of a highly available system, such that service outage caused by failures can be minimized and service availability can be maximized. The method and system can be used by system administrators and/or integrators who define the AMF configuration. The AMF configuration includes attributes, the values of which are used by the AMF to manage the high availability of services provided by software components. Among these attributes is a component_disable_restart (also referred to as the "disable_restart attribute"), which has a Boolean value that specifies whether a component restart is a desirable recovery in case of failure.

In one embodiment, the method and the system determine an attribute value (or referred to as an attribute setting) in the AMF configuration, where the attribute value is used by the AMF at runtime to determine whether to restart or failover a component. In one embodiment, the attribute is the disable_restart attribute associated with each component. A system integrator can configure the attribute setting of a component in the AMF configuration, thus forcing the AMF to perform a desirable recovery action at runtime. The disable_restart attribute value can be set at configuration time, given that the AMF configuration provides a deterministic assignment between the workload (represented by service-instances and their component-service-instances) and the corresponding resources (represented by service-units and their components).

In one embodiment, the disable_restart attribute is writable at both the configuration time and at runtime. Therefore, in one embodiment, the value of the disable_restart attribute can be evaluated and set accordingly at runtime. Setting or updating the attribute value at runtime is beneficial for at least the following reasons.

First, it is expected that a given system may have different components capable of providing the same type of service for several reasons, e.g., scalability, availability, etc. To allow for flexibility, the AMF configuration may not define a deterministic assignment at the configuration time with respect to the assignment of service-instances to service-units and component-service-instances to components. The attributes describing this assignment are optional, and these attributes allow for equal preference in terms of which service-unit is assigned a service-instance (and similarly which component is assigned a component-service-instance). Therefore, at the configuration time it may not be possible to define the optimum value of the disable_restart attribute for a component, because the service-instances that will be impacted by the failure of the component are not yet known. As such, the configuration time calculations to maximize the service availability may not be accurate or complete.

Moreover, runtime system performance may change over time due to various factors such as software/hardware "aging" (e.g., being less responsive due to extended usage), failures, upgrades, extra components that are added after the initial deployment and compete for resources with other components, and other factors. From this perspective, the restart time of a given component is not constant and over time it might change in such a way that exceeds its failover time. Runtime monitoring keeps track of these changes. Based on the system-integrator's preference and runtime evaluation, a suitable policy can be determined to set the disable_restart attribute for each component at runtime.

FIG. 1 is a block diagram illustrating an exemplary AMF configuration for a system according to one embodiment. In the AMF configuration, there is one service-group (SG) containing two redundant service-units (SU1 and SU2). The service-group adopts 2N redundancy, according to which SU1 is assigned an active role and SU2 is assigned a standby role. When any component in SU1 fails over to SU2, all of the other sibling components in SU1 also switch over to SU2. In this example, each service-unit has three components (C1, C2, C3 in SU1 and C1', C2', C3' in SU2). The components C1', C2' and C3' are the failover components for C1, C2 and C3, respectively.

The service-group SG protects two service-instances (SI1 and SI2). Each service instance is composed of two component-service-instances (CS1, CS2 and CS3, CS4). The AMF configuration also contains a dependent service-instance (SI3). SI3 can only be provided (i.e., assigned active to a service-unit) when its sponsoring service-instance (SI2) is assigned active. SI3 can be assigned active to any service-unit within or outside of SG. When SI2 loses its active assignment (e.g., due to failures), SI3 can only keep its active assignment for a pre-configured period of time (t3) referred to as the tolerance time. Note that t3 is configurable and specified in the configuration for SI3.

As used herein, the term failover/restart "outage" is associated with the unavailable time period of a service-instance due to the failure/restart of a component. The term failover/restart "duration" is associated with the unavailable time period of a component due to its failover/restart.

Whenever a component failure occurs, all of the service-instances that have any of their component-service-instances provided by the faulty component will be impacted. Depending on the component recovery, the outage time of the service-instance depends on whether the faulty component is failed over or restarted. The failure may also impact the dependent service-instances that are not necessarily provided by the faulty component, but depend on service-instance(s) that are provided by the faulty component.

As described above, the AMF specification recommends that the disable_restart attribute should be set to true if the component failover is faster than its restart, and otherwise it should be set to false. However, this conventional approach is too simplistic and can sometimes be invalid. The problem with the conventional approach is that it does not consider the scenarios in which a service-instance may be provided by several components. Since the service-instance must failover as a whole unit, its failover time depends on all of the components providing it, and not only the faulty component. Thus, it necessitates further analysis to determine whether to restart or failover a component. It is helpful to illustrate the problem of the conventional approach with respect to the system of FIG. 1 and the parameters shown in Table 1:

TABLE 1

Failover and restart times

| | Failover time | Restart time |
|---|---|---|
| C1 | F1 | R1 |
| C2 | F2 | R2 |
| C3 | F3 | R3 |

Assume that $F1<R1$, and $F2>R1$ and $R2<F1$. According to the AMF specification, the disable_restart of component C1 would be set to true, since the failover is faster. This means that SI1 will failover in case C1 fails. The failover outage of SI1 is max (F1,F2), since SI1 is assigned to both of these components. Thus, SI1 will experience an outage of F2 (where F2>(F1 and R1). However, it would have been better to restart C1, and let SI1 endure an outage of R1 even though F1<R1.

In the above example, restarting C1 is a better recovery action for SI1 than failover. However, restarting C1 may not be a better recovery for SI3. For SI3, whether to restart or failover C1 depends on the values of F3 and R3, as well as their relations with respect to F1 and R1. In short, a suitable recovery action for SI1 may be not suitable for SI3, and therefore conflicting recovery preferences may occur for each service-instance. Thus, the choice between the failover recovery and the restart recovery may not be straightforward, and further analysis under specific criteria is necessary.

Figure 2:
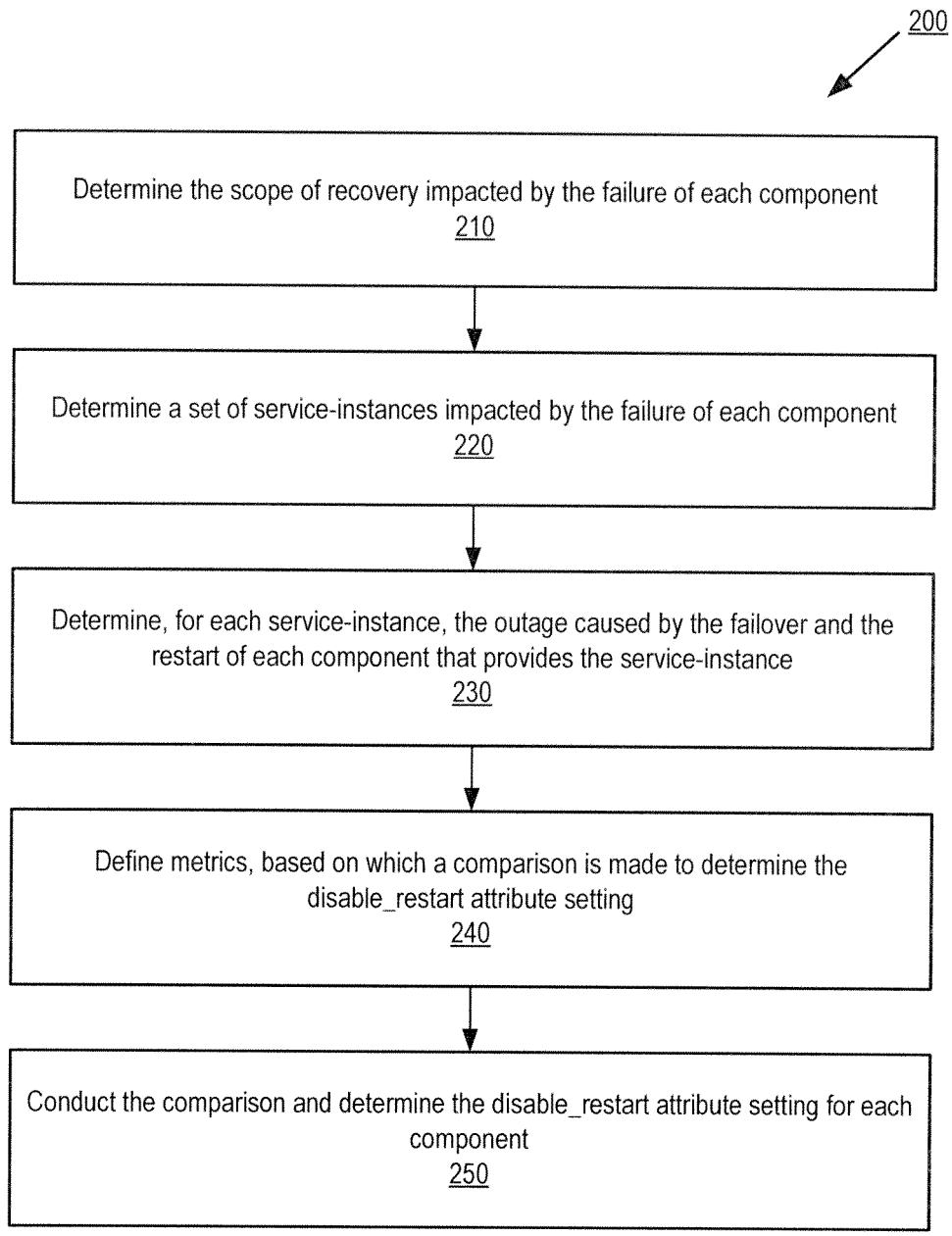
FIG. 2 is a flow diagram illustrating a method determining whether to restart or failover a component according to one embodiment of the invention.

In the following, a method and system for setting the disable_restart attribute are described to minimize service outage and maximize service availability according to predetermined metrics. FIG. 2 is a flow diagram illustrating a method 200 for determining whether to restart or failover a component according to one embodiment. It is noted that the first four steps of FIG. 2 can be reshuffled and can be performed in any order. With a given AMF configuration, the method 200 ensures that the disable_restart attribute can be set to an optimal value for each component in the AMF configuration.

The method 200 begins with determining the scope of the recovery impacted by the failure of each component (block 210). For each component, the impact of restarting the component or failing it over on the other components is determined. To make this determination, some of the relevant configuration attributes are examined; for example: (1) the redundancy model of the service-group; (2) the service-unit failover attribute; (3) the component instantiation-level attribute; and (4) the service-group auto-adjust attribute.

The redundancy model and the service-unit failover attribute affect the scope of impacted components in case of a failover recovery. The component instantiation-level affects the scope of impacted components when the recovery is a restart.

More specifically, a service-group is characterized by a redundancy model. The AMF specification defines five different redundancy models. In the 2N, N+M and no redundancy, the failover of a component means the switchover of all of the other sibling components in the same service-unit; i.e., all of the components of the service-unit are impacted by the failover recovery. In the Nway and NwayActive redundancy model, this is not the case; i.e., the faulty components of the same service-unit can individually failover onto other components in other service-unit(s). As for the healthy components (in the same service-unit of the faulty components), only the component-service-instances that share the same service-instance assigned to the faulty component will switchover, however the CSIs provided by the healthy components will not (unless the faulty components cannot be repaired by AMF, in which case an escalation recovery can be triggered).

The service-unit failover attribute specifies whether all of the service-unit's components should failover in case any of the components in the service-unit fails over. It is applicable to any redundancy model.

The component instantiation level attribute specifies the order in which the components of the same service-unit are instantiated. This attribute is used to capture a component dependency. The reverse order is used to terminate the components in case of a restart; i.e., when a component with a higher instantiation order is restarted, its sibling components with a lower instantiation order are restarted as well.

The service-group auto-adjust attribute specifies whether after a failover, the configuration should revert back to a preferred configuration. This means that an "additional" switchover is needed to reassign the service-instances back to the preferred service-units.

After the scope of recovery is determined, the method 200 determines a set of service-instances impacted by the failure of each component (block 220). A service-instance is impacted by a component failure if any of its component-service-instances is provided by the faulty component. Service-instances can have dependencies among each other. The tolerance time is a configuration attribute that specifies how long a service-instance can remain assigned (i.e., provided) once its sponsor service-instance is not assigned.

The assignment of service-instances to service-units is performed at runtime by the AMF according to some preferences specified by the configuration. A component can be assigned a component-service-instance if its type can provide the component service type of the component-service-instance. If multiple components in the same service-unit can provide the component service type, then it is up to the AMF implementation to determine which component will be assigned which component-service-instance. This assignment information is available at runtime; thus, in general, the disable_restart attribute can be updated at runtime.

If for some reason the runtime solution is not implemented for a configuration with un-deterministic services assignment, then when setting the disable_restart attribute at configuration time, the worst case scenario may be assumed; i.e., a component provides the maximum number of component-service-instances it can support.

Next, the method 200 determines, for each service-instance, the outage caused by the failover and the restart of each component that provides the service-instance (block 230). The outage caused by failovers and restarts are determined as follows.

The failover outage is the time needed to cleanup a faulty component and reassign the service-instance to another service-unit. When the service-instance is provided by several components, the outage depends on the slowest component to failover or switchover. With respect to service-instance dependency, if the sponsor service-instance ("sponsor") outage exceeds the tolerance time of the dependent service-instance ("dependent"), then the dependent will lose its assignment. The dependent must then wait for the sponsor to get its active assignment before it can be re-assigned. If the auto-adjust is true, then an additional switchover is needed to restore the pre-failure assignments. The additional outage (caused by this switch over) is the time needed to remove the active assignments and reassign them to the recovered service-unit.

As for the restart outage, it is the time needed to cleanup, instantiate and make the active assignment. However, if component dependencies are captured by the component instantiation level attribute, the components with the higher instantiation level have to wait for the ones with the lower instantiation level to be cleaned up first, and the opposite scenario occurs upon instantiation where the components with the lower instantiation level have to wait for the components with the higher instantiation level to be instantiated. Again in this case, the dependent service-instances must wait for their sponsor service-instance(s) to be assigned first, which may prolong the dependents' outage.

Subsequently, the method 200 defines metrics, based on which a comparison can be performed to determine the disable_restart attribute setting (block 240). In the example of FIG. 1 and Table 1, it has been shown that if a component recovery affects multiple service-instances, then a preferred recovery for one service-instance may not be favorable for other service-instances. Thus, metrics need to be defined to enable the comparison of the recovery impact and the selection of the optimal recovery for each component. Several metrics can be used for this purpose; for example, total number of impacted service-instances, total outage of the impacted service-instances, a combination of the above two numbers, or other suitable metrics. In one embodiment, the service-instance ranking, which is a configuration attribute that defines the importance of a service-instance, can be used to favor recoveries that have less impact on the more important (i.e., higher ranked) service-instances.

Finally, the method 200 conducts a comparison of recovery actions based on the metrics, and determines the disable_restart attribute for each component (block 250).

The above operations of blocks 210, 220 and 230 determine the exact impact of the component recovery actions (restart and failover) on the service-instances. The operation of block 240 provides the metrics for the comparison. The operation of block 250 compares the recovery actions based on the metrics selected from block 240, and determines for each component the optimal recovery action.

Having described the five-step approach for determining a recovery action for each component, a numerical example is presented based on the configuration shown in FIG. 1. The method 200 is applied to the configuration to determine the optimal recovery for a specific Component C1. In the following example, it is assumed that the redundancy model is 2N, and the service-unit failover attribute is set to true. It is also assumed that all of the components have the same instantiation level, and the service-group auto adjust is set to false as shown in Table 2.

TABLE 2 configuration attributes

| Attribute | Value |
| --- | --- |
| Redundancy model | 2N |
| Service-unit failover | true |
| Instantiation level | 1 (for all components) |
| Service-group auto-adjust | false |
| SI3 tolerance time (t3) | 16 |
| SI3 assignment time | 4 |

In this example, the failover and restart durations for each component are provided as numerical values in Table 3. These numerical values are examples of the symbolic values (F1, F2, F3 and R1, R2, R3) shown in Table 1.

TABLE 3 failover and restart durations (in unit of time)

| | Failover Duration | Restart Duration |
| --- | --- | --- |
| C1 | 15 | 20 |
| C2 | 40 | 30 |
| C3 | 12 | 10 |

TABLE 4

Service-instance ranks

| | Service-instance rank |
| --- | --- |
| SI1 | 1 |
| SI2 | 3 |
| SI3 | 1 |

Table 4 shows the ranking of the service-instances based on their relative importance. The five-step approach of the method 200 is applied to the example with the assumption that Component C1 fails.

As the first step, the scope of recovery impacted by the failure of C1 is determined. With respect to component restart, the restart of a faulty component only impacts the faulty component. This is because the instantiation level is the same for all of the components; therefore, there is no dependency among the components to propagate the restart. With respect to component failover, as the service-unit failover attribute is set to true, any component failover will trigger an entire service-unit failover. Thus, the component failover impacts all of the components of the service-unit.

As the second step, the set of service-instances impacted by the component failure is determined. Table 5 summaries this impact with respect to failover and restart of each component.

TABLE 5

Service-instances impacted by the recovery

| | Failover impact | Restart impact |
| --- | --- | --- |
| C1 | SI1, SI2, SI3 | SI1, SI2, SI3 |
| C2 | SI1, SI2, SI3 | SI1 |
| C3 | SI1, SI2, SI3 | SI2, SI3 |

At this point, it is assumed that SI3 is impacted whenever SI2 is impacted due to SI3's dependency on SI2. However, this assumption can be revised later upon further analysis. The further analysis may reveal that if the tolerance time (t3) of SI3 is longer than the outage of SI2, then SI3 will not be impacted by the failure.

As the third step, the outage for each service-instance caused by the recovery of C1 is determined. Table 6 illustrates the outage for each service-instance caused by C1 failover and C1 restart. For instance, SI1 has a failover outage of 40 which is max (F1,F2), and SI2 has a failover outage 15 which is max (F1,F3). Since SI3 has a tolerance time of 16, failing over SI2 does not impact SI3 (because 16 is longer than the SI2 failover outage time of 15). The restart of C1 will cause SI1 and SI2 to have a restart outage of 20, which is equal to R1. Since the restart outage of SI2 is longer than SI3's tolerant time of 16 by 4 time units, the restart will cause SI3 to be out for 8 (because (20-16) plus 4 for re-assignment of SI3).

TABLE 6

Service-instance outage time

| C1 recovery | Failover Outage | Restart Outage |
| --- | --- | --- |
| SI1 | 40 | 20 |
| SI2 | 15 | 20 |
| SI3 | 0 | 8 |

Although not shown in the scenario of FIG. 1 on which Table 6 is based, the component-service-instances within the same service-instance may depend on one another. The component-service-instance dependency is limited within the scope of a service-instance; i.e., a given component-service-instance can only depend on another component-service-instance that is in the same service-instance. In the example of FIG. 1, if CSI2 depends on CSI1 (both of which are in SI1), CSI1 needs to be assigned to a component before CSI2 can be assigned to its component. Since an SI can only be considered provided when all of its component-service-instances are assigned active to the components, then a sequential assignment of CSI1 and CSI2 caused by the component-service-instance dependency will affect the outage time of SI1 in case of a component failure. Thus, when determining the failover outage and the restart outage of each service-instance, the dependencies of component-service-instances in a service-instance also needs to be considered.

As the fourth step, metrics are defined based on which a comparison to determine the optimal solution can be performed. Table 6 shows that while the failover of C1 is preferable for SI2, the restart of C1 is preferable for SI1. Thus, a question here is which recovery to select for C1. In one embodiment, it is up to the system integrator to define the metrics for selection according to the importance of the services. To illustrate this point, two metrics are presented in this example. These two example metrics are: the total outage time, and the total number of impacted service-instances. It is understood that other metrics can also be used.

As the fifth step, a comparison is conducted to determine the optimal value of the disable-restart attribute for C1. According to the values in Table 7, it can be seen that the restart causes less total outage time but impacts more service-instances while it is the opposite with the failover. Based on the metrics of interest, either one of the recovery actions may be favored over the other. Additional metrics may be considered for conducting the comparison. For example, the comparison can further incorporate the service-instance rank of Table 4 to favor, for example, the recovery that causes less outage to the service-instance with the higher rank.

TABLE 7

Service-instance outage times

| | Total outage time | Total number of impacted service-instances |
|---|---|---|
| C1 restart | 48 | 3 (all SIs) |
| C1 failover | 55 | 2 (SI1, SI2) |

In some embodiments, the method 200 can be executed at runtime as described previously. After the initial assignment made by the AMF, the five steps of the method 200 can be executed at runtime to dynamically adjust the disable_restart attribute for each component. Each time the service assignment changes, the method 200 can be invoked to re-assess the optimum setting of the disable_restart attribute for each component. It is noted that executing the method 200 does not cause any delays to the service assignment, as the method 200 is invoked after the service assignment is made.

The method 200 can also be extended to monitor the restart and failover durations of each component, and detect changing patterns in these durations. A change in the durations of the restart or failover of a component may change which recovery action to favor for that component. Thus, the value of the disable_restart attribute for that component may be changed accordingly at runtime.

Figures 3, 4A, 4B:
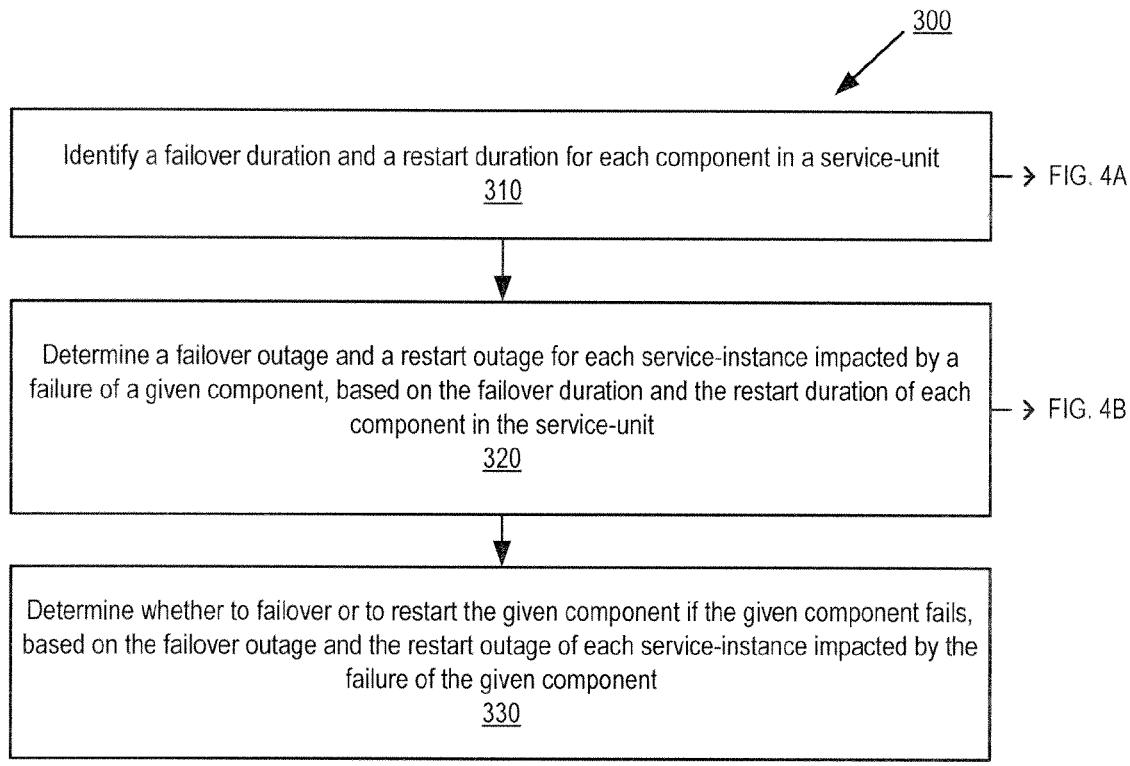
FIG. 3 is a flow diagram illustrating a method for determining an AMF configuration of a highly available system according to one embodiment of the invention.
FIGS. 4A and 4B illustrate the information generated by the method of FIG. 3 according to one embodiment of the invention.

FIG. 3 illustrates a method 300 for determining an AMF configuration of a highly available system, according to one embodiment of the invention. The AMF configuration specifies at least two service-units containing components that represent resources, and a set of service-instances representing workload incurred by provision of services using the resources. The method 300 may be performed by a computer system, such as a computer system 500 to be described below with reference to FIG. 5. One or more parts of an embodiment of the invention may be implemented using different combinations of software, firmware, and/or hardware.

In one embodiment, the method 300 begins with the computer system identifying a failover duration and a restart duration for each component in a service-unit of the at least two service units (block 310). As an example, the operation of block 310 produces a table shown in FIG. 4A. The table shows the failover duration and the restart duration for each component (C1, C2, C3) in a service-unit. This table corresponds to the numerical example of Table 3. Although a table is shown in FIG. 4A, it is understood that the information produced by the operation of block 310 can be in any data format.

The computer system also determines a failover outage and a restart outage for each service-instance impacted by a failure of a given component, based on the failover duration and the restart duration of each component in the service-unit (block 320). As an example, the operation of block 320 produces a table shown in FIG. 4B for each component Ci, where i=1, 2 or 3. The table shows, if Ci fails, the failover outage and the restart outage for each service-instance. In the example of FIG. 1, the service-instances that may be impacted by the failure of C1, C2 and C3 are SI1, SI2 and SI3. The table of FIG. 4B table corresponds to the numerical example of Table 6 with Ci=C1. Although a table is shown in FIG. 4B, it is understood that the information produced by the operation of block 320 can be in any data format.

The computer system then determines whether to failover or to restart the given component if the given component fails, based on the failover outage and the restart outage of each service-instance impacted by the failure of the given component (block 330). In one embodiment, the result of the determination is used to set the disable_restart attribute of the given component.

Figure 5:
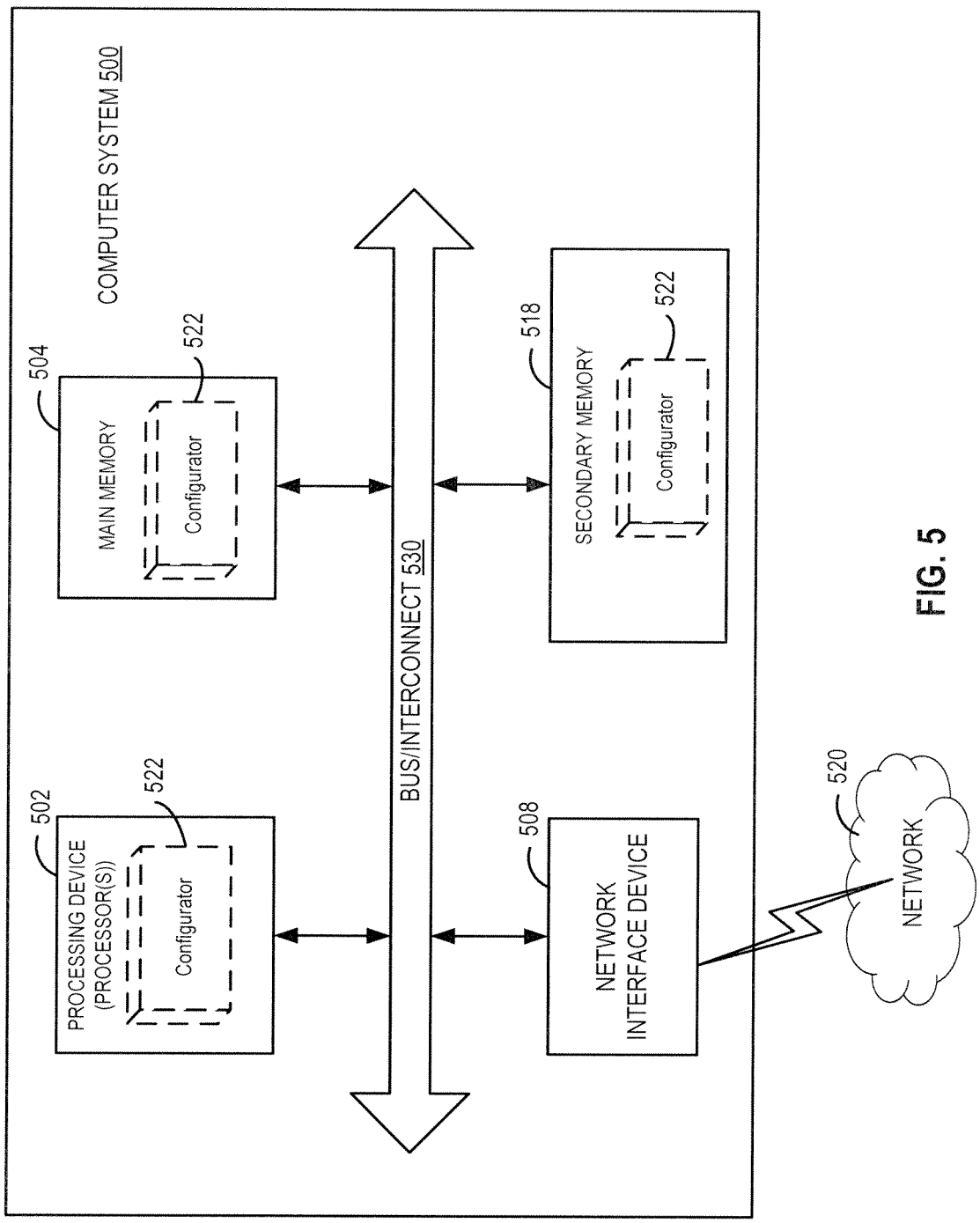
FIG. 5 illustrates an exemplary computer system according to one embodiment of the invention.

FIG. 5 illustrates a diagrammatic representation of a machine in the exemplary form of a computer system 500 within which a set of instructions, for causing the machine to perform any one or more of the methodologies discussed herein, may be executed. The computer system 500 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502. The processing device 502 represents one or more general-purpose processors, each of which can be: a microprocessor, a central processing unit (CPU), a multicore system, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

In one embodiment, the processing device 502 is adapted to execute the operations of methods 200 and 300 of FIG. 2 and FIG. 3. In another embodiment, the processing device 502 is adapted to execute the operations of a configurator 522 to perform the operations of methods 200 and 300 of FIG. 2 and FIG. 3.

In one embodiment, the processor device 502 is coupled to one or more memory devices such as: a main memory 504 (e.g., read-only memory (ROM), flash memory, dynamic random access memory (DRAM) such as synchronous DRAM (SDRAM) or Rambus DRAM (RDRAM), etc.), a secondary memory 518 (e.g., a magnetic data storage device, an optical magnetic data storage device, etc.), and other forms of computer-readable media, which communicate with each other via a bus or interconnect 530. The memory devices may also have different forms of read-only memories (ROMs), different forms of random access memories (RAMs), static random access memory (SRAM), or any type of media suitable for storing electronic instructions. In the embodiment of FIG. 5, the configurator 522 may be located in one or more of the locations shown as dotted boxes and labeled by the reference numeral 522.

The computer system 500 may further include a network interface device 508. A part or all of the data and code of the configurator 522 may be transmitted or received over a network 520 via the network interface device 508. Although not shown in FIG. 5, the computer system 500 also may include user input/output devices (e.g., a keyboard, a touchscreen, speakers, and/or a display).

In one embodiment, the configurator 522 can be implemented using code and data stored and executed on one or more computer systems (e.g., the computer system 500). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system. One or more parts of an embodiment of the invention may be implemented using different combinations of software, firmware, and/or hardware.

The operations of the methods of FIGS. 2-3 have been described with reference to the exemplary embodiment of FIG. 5. However, it should be understood that the operations of the methods of FIGS. 2-3 can be performed by embodiments of the invention other than those discussed with reference to FIG. 5, and the embodiment discussed with reference to FIG. 5 can perform operations different from those discussed with reference to the methods of FIGS. 2-3. While the methods of FIGS. 2-3 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described; it can also be practiced with modification and alteration within scope of the appended claims. The description is thus to be regarded as illustrative instead of limiting.

What is claimed is:

1. A method performed by a computer system for determining an Availability Management Framework (AMF) configuration of a highly available system, wherein the AMF configuration specifies at least two service-units containing components that represent resources, and a set of service-instances representing workload incurred by provision of services using the resources, the method comprising:
    identifying a failover duration and a restart duration for each component in a service-unit of the at least two service units;
    determining, by the computer system, a failover outage and a restart outage for each service-instance impacted by a failure of a given one of the components, based on the failover duration and the restart duration of each component in the service-unit; and
    determining, by the computer system, whether to failover or to restart the given component if the given component fails, based on the failover outage and the restart outage of each service-instance impacted by the failure of the given component.

2. The method of claim 1, further comprising the step of: determining, for each component in the service-unit, other components in the service-unit that are impacted by a failure of the component, based on dependencies among the components in the service-unit.

3. The method of claim 2, wherein determining the other components is based on one or more attributes of the AMF configuration selected from a group consisting of: a redundancy model of a service-group in which the service-unit resides, a service-unit failover attribute, a component instantiation-level attribute, and a service-group auto-adjust attribute.

4. The method of claim 1, further comprising the step of: determining, for each component in the service-unit, which of the service-instances are impacted by a failure of the component based on assignments of the service-instances to the components and dependencies among the service-instances.

5. The method of claim 1, further comprising the step of: determining the failover outage and the restart outage of each service-instance with consideration of dependencies of component-service-instances in the service-instance.

6. The method of claim 1, further comprising the step of: performing a comparison of predetermined metrics to determine whether to failover or restart the given component, wherein the predetermined metrics include a total number of impacted service-instances.

7. The method of claim 1, further comprising the step of: performing a comparison of predetermined metrics to determine whether to failover or restart the given component, wherein the predetermined metrics include a total outage of impacted service-instances.

8. The method of claim 7, wherein the predetermined metrics further include a ranking of the impacted service-instances.

9. The method of claim 1, further comprising the step of: setting a disable_restart attribute of the AMF configuration at a configuration time of the highly available system when the AMF configuration provides a deterministic assignment between the components and corresponding component-service-instances.

10. The method of claim 1, further comprising the step of: setting a disable_restart attribute of the AMF configuration at runtime in response to an evaluation of runtime operations of the highly available system.

11. A computer system adapted to determine an Availability Management Framework (AMF) configuration of a highly available system, wherein the AMF configuration specifies at least two service-units containing components that represent resources, and a set of service-instances representing workload incurred by provision of services using the resources, the computer system comprising:

one or more memory devices; and
one or more processors coupled to the one or more memory devices, the one or more processors being operative to:
identify a failover duration and a restart duration for each component in a service-unit of the at least two service-units;
determine a failover outage and a restart outage for each service-instance impacted by a failure of a given one of the components, based on the failover duration and the restart duration of each component in the service-unit; and
determine whether to failover or to restart the given component if the given component fails, based on the failover outage and the restart outage of each service-instance impacted by the failure of the given component.

12. The computer system of claim 11, wherein the one or more processors are further adapted to determine, for each component in the service-unit, other components in the service-unit that are impacted by a failure of the component, based on dependencies among the components in the service-unit.

13. The computer system of claim 12, wherein determination of the other components is based on one or more attributes of the AMF configuration selected from a group consisting of: a redundancy model of a service-group in which the service-unit resides, a service-unit failover attribute, a component instantiation-level attribute, and a service-group auto-adjust attribute.

14. The computer system of claim 11, wherein the one or more processors are further adapted to determine, for each component in the service-unit, which of the service-instances are impacted by a failure of the component based on assignments of the service-instances to the components and dependencies among the service-instances.

15. The computer system of claim 11, wherein the one or more processors are further adapted to determine the failover outage and the restart outage of each service-instance with consideration of dependencies of component-service-instances in the service-instance.

16. The computer system of claim 11, wherein the one or more processors are further adapted to perform a comparison of predetermined metrics to determine whether to failover or restart the given component, wherein the predetermined metrics include a total number of impacted service-instances.

17. The computer system of claim 11, wherein the one or more processors are further adapted to perform a comparison of predetermined metrics to determine whether to failover or restart the given component, wherein the predetermined metrics include a total outage of impacted service-instances.

18. The computer system of claim 17, wherein the predetermined metrics further include a ranking of the impacted service-instances.

19. The computer system of claim 11, wherein the one or more processors are further adapted to set a disable_restart attribute of the AMF configuration at a configuration time of the highly available system when the AMF configuration provides a deterministic assignment between the components and corresponding component-service-instances.

20. The computer system of claim 11, wherein the one or more processors are further adapted to set a disable_restart attribute of the AMF configuration at runtime in response to an evaluation of runtime operations of the highly available system.

* * * * *